Feb. 24, 1953  H. C. KRONE ET AL  2,629,395
HYDRANT FOR AIRCRAFT REFUELING
Filed March 21, 1951  2 SHEETS—SHEET 1

INVENTORS:
Howard C. Krone &
William Meyer,
BY George D. Richards
Attorney

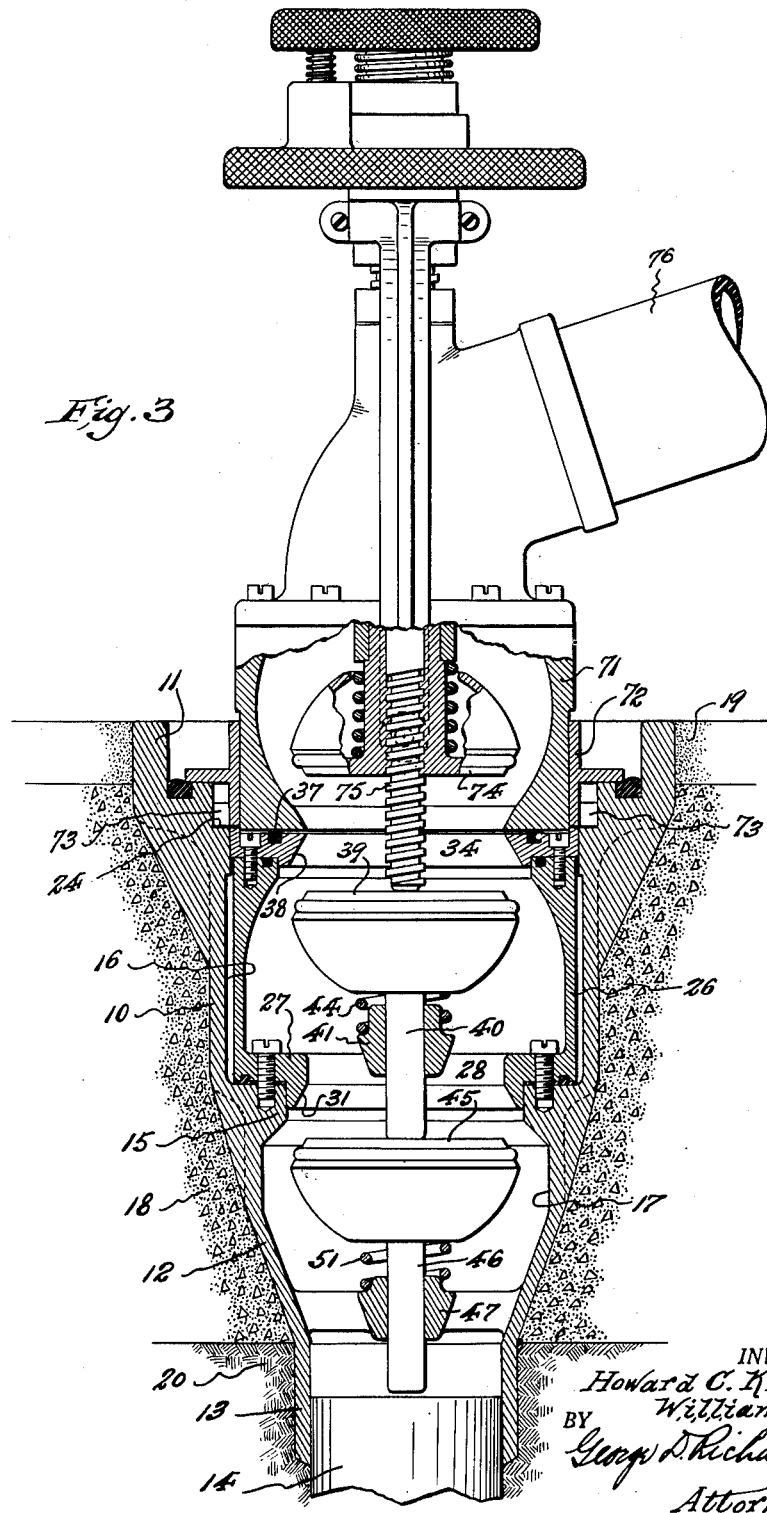

Patented Feb. 24, 1953

2,629,395

UNITED STATES PATENT OFFICE 2,629,395

HYDRANT FOR AIRCRAFT REFUELING

Howard C. Krone, Ridgewood, and William Meyer, East Orange, N. J., assignors to Wheaton Brass Works, Newark, N. J., a corporation of New Jersey Application March 21, 1951, Serial No. 216,716

3 Claims. (Cl. 137—283)

This invention relates to improvements in hydrant structures for connection with underground pipe lines; and the invention has reference, more especially, to an improved hydrant structure adapted to be countersunk in imbedded relation to the apron of an airport loading station at which aircraft are refueled, and in connection with an underground pipe line through which liquid fuel, such e. g. as gasolene, is delivered from remote storage facilities.

Due to the increase in air transportation throughout the world, with resultant increase in the number of aircraft requiring refueling service at approximately the same time, an increased number of fuel carrying and servicing vehicles are brought into use with consequent increase of congestion on the loading apron of an air port. Large capacity refueler tank trucks heretofore commonly used require a great deal of space in which to maneuver, and therefore greatly add to congestion.

In order to avoid such congestion, it has been proposed to provide pits containing refueling equipment served by underground pipe lines; such pits being located at various points on the loading apron of the air port. Such solution of the problem, however, is not wholly satisfactory, since such type of equipment not only creates hazards due to fuel leakage, but is difficult to use and maintain. Such pit housed equipment usually includes a hydrant valve with a separate manipulatable emergency valve connected with its intake end, so that the hydrant valve can be manually cut off from the fuel delivery pipe line, without interfering with other hydrant valves connected with said pipe line, when repair or other servicing of the hydrant valve becomes necessary. Such separate emergency valve requires independent and sometimes complicated manipulatable means by which it can be actuated, and such separate emergency valve and its manipulatable actuating means further increases risk of leakage and consequent fire hazard. Furthermore, an open housing pit required for such type of refueling equipment is subject to the collection of dirt, water and spilled fuel, and consequently requires frequent cleaning.

Having the above in view, it is an object of this invention to provide a novel construction of hydrant valve and associated automatic shut-off or check valve in a single housing or casing, whereby to provide a complete and very compact single unit which can be countersunk in imbedded relation to the concrete mass of a loading apron, and flush with the surfacing of said apron; the unit, thus installed, being of such character that space for possible collection of dirt, water and gasolene is reduced to a minimum, and consequently necessity for frequent cleaning and like maintenance is substantially eliminated.

Another object of the invention is to provide a hydrant valve and associated automatic shut-off or check valve in a single housing, including the provision of a water-tight, detachable cover member for the housing, together with key actuatable means for releasably locking the cover member to the housing.

The invention has for a further object to provide a hydrant unit of the above stated character, wherein the hydrant valve seat and plunger can be readily removed for repair or other servicing, and wherein removal of the hydrant valve seat and plunger causes the cut-off or check valve to automatically close, whereby to effectively shut off the hydrant unit from a pipe line to which it is connected, without in any way interfering with the use and operation of other hydrant units which are served by the pipe line.

A still further object of this invention is to provide a hydrant structure for connection with an underground fuel delivery pipe line, said hydrant structure being flush with the loading apron surface of an airport loading station, so that the hydrant structure offers no impediment to movement of vehicles over said surface, and whereby a small, easily maneuverable and economical hose cart can be used in the operation of connecting the hydrant with aircraft to be refueled, thus avoiding necessity for use of large and costly refueler tank trucks, and consequently eliminating much congestion which use of the latter involves, and thereby also further reducing fire hazard due to the small quantity of fuel at the hose cart.

Other objects and advantages of the present invention will be referred to and will become apparent from the following detailed description of said invention.

An illustrative embodiment of the invention is shown in the accompanying drawings, in which:

Fig. 3 is a longitudinal sectional view of the hydrant structure with its cover member removed and a coupling valve means operatively coupled thereto to open the same for the outflow of fuel therefrom, parts being shown in elevation.

Similar characters of reference are employed in the above described views to indicate corresponding parts.

Figure 1:
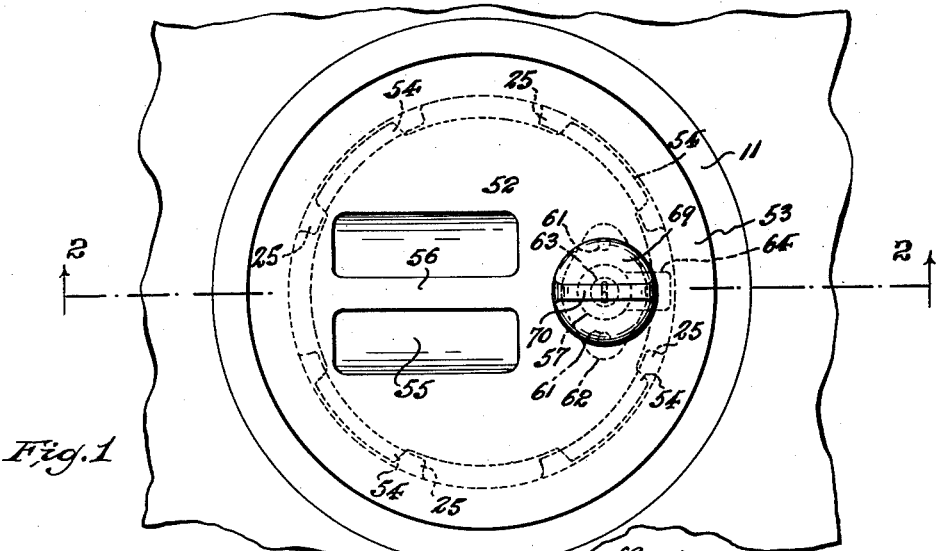
Fig. 1 is a top plan view of a hydrant structure according to this invention with the cover member therefor in place and locked thereto.

The hydrant structure according to this invention comprises an endwise open housing 10 provided at its upper end with a diametrically enlarged mouth section 11, and at its lower end with a tapered section 12 which terminates in a neck portion 13 to which an underground pipe line 14 can be connected, whereby to deliver fuel to and for outflow from the hydrant structure. Intermediate its ends, the housing 10 is provided with an internal annular shoulder 15 which is integral therewith. This shoulder 15 so divides the interior of the housing as to provide an upper hydrant valve chamber 16 and a lower cut-off or check-valve chamber 17. The housing thus formed is adapted to be imbedded in the concrete mass 18 of a loading apron at an airport loading station, with its mouth section 11 countersunk flush with the surface dressing 19 of said apron, and with its lower neck portion 13 projecting into the earth 20 underlying said apron, and through which the underground pipe-line 14 extends.

The mouth section 11 of the housing 10 is formed with an internal annular shoulder portion 21 which is downwardly offset from the outer open end of the mouth section. An annular channel or seat 22 is countersunk in the top of shoulder portion 21 to receive and hold a resilient sealing gasket 23. The shoulder portion 21 surrounds a receiving socket 24 which overlies the upper end of the hydrant valve chamber 16. Integral with and projecting radially inward from the shoulder portion 21, in upwardly spaced relation to the bottom of the receiving socket 24, are a plurality of circumferentially spaced coupler tongues 25.

Supported within the hydrant valve chamber 16 is a hydrant valve casing 26 having at its bottom end an internal annular flange 27 which defines an axial port 28. Said annular flange 27 is footed upon the internal annular shoulder 15 of the housing 10, being detachably secured thereto by fastening screws 29. Disposed between said flange 27 and the shoulder 15 is a sealing gasket 30, thus assuring a liquid tight joint between the cut-off or check-valve chamber 17 and the hydrant valve chamber 16 of housing 10. The lower marginal portion of flange 27, which overhangs the cut-off or check-valve chamber 17, is formed to provide a downwardly facing valve seat 31 which surrounds the port 28, and which is engageable by a cut-off or check-valve means presently to be more particularly described. The upper end of the valve casing 26 is open, and secured thereto, by fastening screws 32, is an annular valve seat member 33 which defines a hydrant valve controlled discharge port 34. Carried by the upper end of the hydrant valve casing 26 is a resilient sealing gasket 35 to seal the joint between the valve seat member 33 and said hydrant valve casing 26 against leakage. An annular channel or seat 36 is countersunk in the top end of the hydrant valve casing 26 to receive and hold a resilient sealing gasket 37. Said valve seat member 33 is provided with a downwardly facing valve seat 38 which surrounds the discharge port 34, and which is engageable by the hydrant valve means now about to be described.

The hydrant valve means comprises a valve member 39 having an axial downwardly extending stem 40 which is slidably supported by a valve guide member 41. The valve guide member 41 is supported within the hydrant valve casing 26, from the walls of the latter, by spider arms (not shown). Supported in connection with the periphery of the hydrant valve member 39, and held in operative assembled relation thereto by a retainer member 42, which is threaded onto said valve member, is a seal ring 43 of suitable resilient material. When the hydrant valve member 39 is disposed to close the discharge port 34, said seal ring 43 bears upon and is compressed against the valve seat 38, whereby to seal the joint between the valve member and seat against leakage. The hydrant valve member 39 is yieldably urged to seated engagement with the valve seat 38, whereby to close the discharge port 34, by a compression spring 44 which is mounted around the valve member stem 40 between the valve member 39 and the valve guide member 41.

The cut-off or check-valve means similarly comprises a valve member 45 having an axial downwardly extending stem 46 which is slidably supported by a valve guide member 47. Said valve guide member 47 is supported within the cut-off or check-valve chamber 17, from the walls of the latter, by spider arms 48. Supported in connection with the periphery of the cut-off or check-valve member 45, and held in operative assembled relation thereto by a retainer member 49, which is threaded onto said valve member, is a seal ring 50 of suitable resilient material. When the cut-off or check-valve member 45 is disposed to close the port 28 intermediate the cut-off or check-valve chamber 17 and the hydrant valve casing 26, said seal ring 50 bears upon and is compressed against the valve seat 31, whereby to seal the joint between the valve member 45 and said seat against leakage. The cut-off or check-valve member 45 is yieldably urged to seated engagement with said valve seat 31, whereby to close said port 28, by a compression spring 51 which is mounted around the valve member stem 46 between the valve member 45 and the valve guide member 47.

A detachable cover means is provided for closing the mouth section 11 of the hydrant housing 10 when the hydrant is not in use. This cover member comprises a body portion 52 which is receivable in the receiving socket 24 of said mouth section 11. The cover member body portion 52 is provided with an external flange 53 of reduced thickness and flush with the outer face of said body portion, this flange being adapted to enter the mouth section 11 of the hydrant housing 10 so as to overlie the internal annular shoulder portion 21 within said mouth section, and in sealed engagement with the sealing gasket 23 with which said shoulder portion is provided. Integral with and projecting radially outward from the cover member body portion 52, in the plane of the bottom face thereof, are a plurality of circumferentially spaced coupler tongues 54. Countersunk in the top or outer face of the cover member body portion 52 is an upwardly open hand hold pocket 55 which is bridged by a hand grip member 56 by which the cover member can be handled, when applying the same to or removing it from the hydrant housing.

To engage the cover member in closing relation to the mouth section 11 of the hydrant housing, the same is opposed to the latter so that its coupler tongues 54 are aligned with the spaces between the coupler tongues 25 of said mouth section, whereupon the cover member is lowered into the mouth section interior, and then turned to carry the coupler tongues 54 beneath the coupler tongues 25, thus interlocking the cover member with the hydrant housing (see Fig. 1). To disengage the cover member, the above described manipulation thereof is reversed.

The cover member is provided with a key actuatable lock means whereby, when applied to the hydrant housing, it can be locked thereto and thus secured against tampering and unauthorized removal. To this end, the body portion 52 of the cover member is provided with a lock casing 57 which projects from an underside cavity 58, upwardly through an opening 59, and thence into an outwardly open socket 60 with which the body portion 52 is provided. The lock casing 57 is suitably secured to the body portion 52, preferably by means of fastening screws 61 passing through a base flange 62 of the lock casing, which is seated within the underside cavity 58, so as to screw into the body portion 52, thus being inaccessible from the exterior of the cover member. Mounted in the lock casing is a rotatable key barrel 63 by which a laterally projectable bolt member 64 is actuated, when a proper key (not shown) is entered in said key barrel. The bolt member 64 is disposed at a level above the coupler tongues 54 of the cover member body portion 52, but so as to lie in the plane of the coupler tongues 25 of the hydrant housing. The lock means thus provided is so positioned on the cover member body portion 52 that, when the latter is interlocked with the hydrant housing in the manner above explained, the bolt member 64, when projected by the key actuated key barrel, will enter the space between adjacent coupler tongues 25 (see Figs. 1 and 2). If under these circumstances it is attempted to rotate the cover member, the projected bolt member will strike one or the other of said adjacent coupler tongues 25, so that rotative movement of the cover member is obstructed before the coupler tongues 54 can be released from engagement with the coupler tongues 25, thus preventing disengaging manipulation of the cover member.

The socket 60 is internally screw-threaded, and terminates at its outer end in a diametrically enlarged section 65 which provides an intermediate annular shoulder 66 for seating a sealing gasket 67. A hollow screw-threaded cover plug 68 is provided which can be detachably screwed into the socket 60, so that an enlarged head portion 69 thereof can seal against the gasket 67. Said cover plug is provided with an external finger piece 70 to facilitate manipulation thereof. It will be obvious that, when the cover plug is in place, it covers and protects the lock means from the elements, and against intrusion of dirt.

The relation of the hydrant valve 39 to the cut-off or check-valve 45 is such that the lower extremity of the stem 40 of the former is normally closely opposed to the latter when said hydrant valve is closed. When the hydrant valve 39 is caused to open, its stem 40 is carried into engagement with the cut-off or check-valve 45, so that descending movement of the hydrant valve is transmitted to the cut-off or check-valve, whereby the latter simultaneously opens upon opening of the former. When the hydrant valve closes under the influence of its spring 44, the cut-off or check-valve will be released to likewise automatically close under the influence of its spring 51.

One of the distinctive advantages of the hydrant structure of this invention is that the same will be automatically cut off from communication with the pipe line by which it is served, in the event it becomes necessary to remove the hydrant valve seat 38 and plunger 39 for cleaning, repair or replacement. To remove the hydrant valve, it is merely necessary to detach the valve seat member 33 by removing the fastening screws 32. This allows the hydrant valve 39 and its stem 40 to be withdrawn from the hydrant housing for such treatment as may be required, and for renewal of sealing gaskets or rings, and other conditioning operations. It will be obvious that when the hydrant valve is removed, the cut-off or check-valve 45 remains closed so as to cut off communication between the pipe line 14 and the hydrant valve chamber 16.

Figure 2:
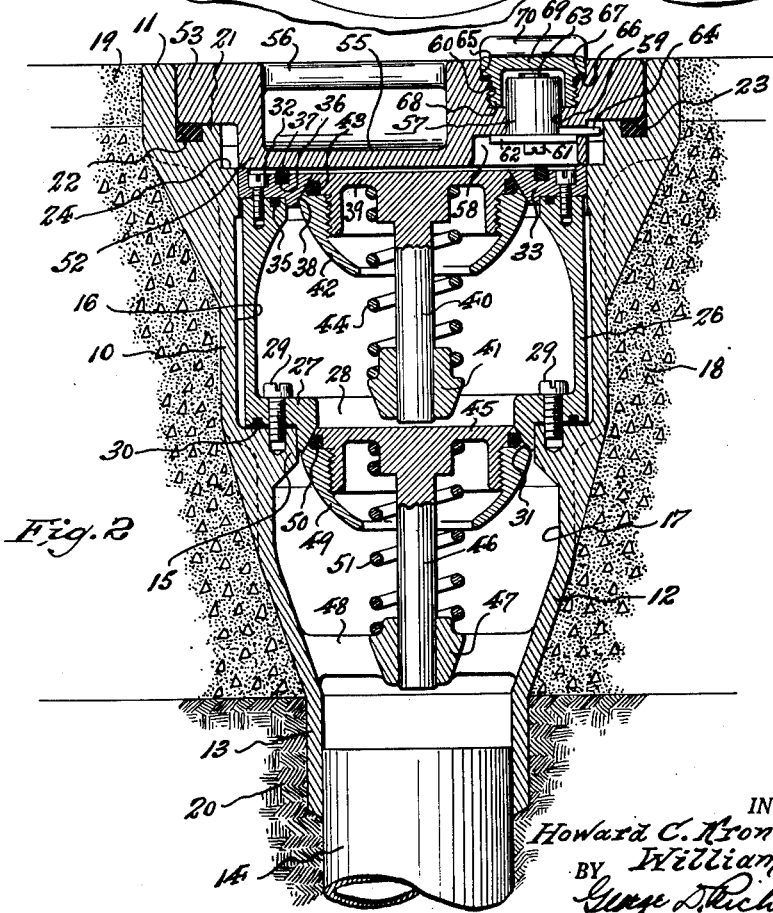
Fig. 2 is a longitudinal view of the same, taken on line 2—2 in Fig. 1.

In the use of the hydrant structure, any suitable valved coupling device may be employed to connect hose or like conduit thereto, provided the coupling device possesses means operative to depress and open the hydrant valves after the coupling device is coupled to the hydrant. For example, a coupling means such as the male coupling member disclosed in our prior United States Letters Patent No. 2,462,512 is well adapted for application to the hydrant of this invention, it being merely necessary to equip the same with coupler tongues corresponding to the coupler tongues 54 of the hydrant cover member body portion 52. A coupling of this character is shown in Fig. 2, with its male coupling member 71 joined to the hydrant in operative connection therewith. The construction and mode of operation of this coupling will be understood by reference to our aforesaid Letters Patent No. 2,462,-512, without necessity for detailed repetition here. Briefly then, the male coupling member 71 is provided with a manually controllable coupler sleeve 72 having coupler tongues 73 for cooperation with the coupler tongues 25 of the hydrant, whereby, when said coupler tongues are engaged, the male coupling member 71 is forced home into the receiving socket 24 of the hydrant, and into sealed contact with the sealing gasket 37 which is mounted on the valve seat member 33 of the hydrant valve 39. The male coupling member 71 is also provided with a normally closed valve member 74 adapted to be raised to open position by a manipulatable actuating stem 75 having screw-threaded connection therewith, and also capable of axial movement therethrough after the valve member is raised and arrested in open position. When, after the male coupling member 71 is coupled to the hydrant, the actuating stem 75 is rotated to open the valve member 74, descending movement of said actuating stem through the arrested open valve member 74 carries the extremity of the stem into engagement with the hydrant valve 39, so that continued downward movement of said stem opens the latter, and through it the cut-off or check-valve 45, thus permitting flow of fuel from the pipe line 14 through the hydrant and coupling means to the hose 76 which leads from the latter. It will be obvious that the hydrant valve and coupling valve member will be closed upon reversing the above described operations, and that thereafter the coupling means can be detached from the hydrant by releasing the coupler sleeve 72, so as to permit disengagement of the coupler tongues 73 thereof from the hydrant coupler tongues 25.

Having now described our invention, we claim:

1. A hydrant structure adapted to be imbedded in the ground substantially flush with the surface thereof to lead from an underground pipe line, said structure comprising an endwise open housing having at its upper end a diametrically enlarged, upwardly open mouth section to provide a receiving socket for detachable reception of either a hose coupling or a hydrant cover member and means at its lower end to receive connection of a pipe line thereto, said housing having an internal annular shoulder intermediate its ends to divide the interior thereof into an upper hydrant valve chamber and a lower cut-off valve chamber, an upwardly open hydrant valve casing within the hydrant valve chamber and detachably secured by its bottom wall to said internal shoulder, the bottom wall of said hydrant valve casing having a port surrounded by a cut-off valve seat facing said cut-off valve chamber, a downwardly yieldable spring closed cut-off valve plunger supported within said cut-off valve chamber to cooperate with said cut-off valve seat, a top wall member detachably secured across the upper open end of the hydrant valve casing and having a discharge port surrounded by a hydrant valve seat facing the hydrant valve chamber, a downwardly yieldable spring closed hydrant valve plunger supported within the hydrant valve casing to cooperate with said hydrant valve seat, said hydrant valve plunger having a dependent axial stem to engage the cut-off valve plunger so that downward opening movement of said hydrant valve plunger is transmitted to said cut-off valve plunger whereby the latter opens simultaneously with the former, said housing mouth section having coupler means engageable by cooperative coupler means of a hose coupling to detachably join the latter to the hydrant structure subject to manipulation operative to open said hydrant and cut-off valve plungers, and said top wall member of the hydrant valve casing having an upwardly presented sealing gasket against which the joined hose coupling seals.

2. A valved hydrant structure adapted to be imbedded in the ground substantially flush with the surface thereof to lead from an underground pipe line, said structure comprising an endwise open housing having means at its lower end to receive connection of the type line thereto, said housing having at its upper end a diametrically enlarged upwardly open mouth to provide a cover member receiving chamber, an internal annular shoulder within said chamber intermediate the top and bottom thereof, circumferentially spaced coupler tongues projecting radially inward from said shoulder and spaced above the bottom of said chamber, a cover member movable axially into said chamber, said cover member having a peripheral top flange to seat on said internal shoulder, a sealing gasket mounted on said shoulder engageable by said top flange, said cover member having circumferentially spaced coupler tongues projecting radially outward therefrom for engagement beneath said coupler tongues in the chamber by rotaton of the cover member whereby to detachably secure the latter in closing relation to the hydrant structure, said cover member having an upwardly open hand hold pocket and a hand grip member bridging the same by which said cover member can be manipulated, and a key barrel actuatable lock device mounted in said cover member, said lock device having a movable bolt projectible into a space between adjacent coupler tongues within the chamber, whereby upon abutment with one or the other of the latter to prevent releasing rotation of the cover member.

3. In a valved hydrant according to claim 2, a hollow cover plug detachably engageable with the cover member to protectively enclose the key barrel of the lock device.

HOWARD C. KRONE.
WILLIAM MEYER.

REFERENCES CITED

The following references are of record in the file of this patent:

UNITED STATES PATENTS

| Number | Name | Date |
|---|---|---|
| 252,888 | Mathews | Jan. 31, 1882 |
| 402,115 | Tyler | Apr. 23, 1889 |
| 938,064 | Longe | Oct. 26, 1909 |
| 1,164,077 | Duey | Dec. 14, 1915 |
| 1,165,026 | Schreidt | Dec. 21, 1915 |
| 1,738,069 | Holston | Dec. 3, 1929 |
| 1,855,264 | Thompson | Apr. 26, 1932 |
| 1,966,745 | Wilson | July 17, 1934 |
| 2,034,933 | Wilson | Mar. 24, 1936 |
| 2,264,760 | Kling | Dec. 2, 1941 |
| 2,292,674 | Terrell | Aug. 11, 1942 |

FOREIGN PATENTS

| Number | Country | Date |
|---|---|---|
| 335,170 | Great Britain | Oct. 17, 1930 |